US006948148B2

United States Patent
Meier et al.

(10) Patent No.: US 6,948,148 B2
(45) Date of Patent: Sep. 20, 2005

(54) SYSTEM FOR AUTOMATED GENERATION OF DATA PATH MACRO CELLS

(75) Inventors: Victoria Meier, Ft Collins, CO (US); William C Borough, Fort Collins, CO (US); Jeffrey Thomas Robertson, Wellington, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 627 days.

(21) Appl. No.: 10/068,649

(22) Filed: Feb. 5, 2002

(65) Prior Publication Data

US 2004/0205610 A1 Oct. 14, 2004

(51) Int. Cl.[7] ............................................. G06F 17/50
(52) U.S. Cl. ............................ 716/18; 716/11; 716/14
(58) Field of Search .......................... 716/11, 14, 18, 716/1, 17

(56) References Cited

U.S. PATENT DOCUMENTS 5,150,308 A * 9/1992 Hooper et al. ................ 716/18
6,408,428 B1 * 6/2002 Schlansker et al. ........... 716/17

* cited by examiner

Primary Examiner—Thuan Do

(57) ABSTRACT

Generating a data path macro cell based upon a text format template comprising variables. The system provides for creating a text format template by generating a text format representation of a data path macro cell based upon data representing a graphical layout of the data path macro cell. Variables are substituted for constants. Variables are changed to values associated with a macro cell having desired characteristics to create a text format file representative of a desired macro cell. Graphical data representing the layout of a macro cell is generated based upon the text format file.

18 Claims, 5 Drawing Sheets

```
$FILES                  / 352
W_DFF1_W_width_D;    / 354
$;
EDIT W_DFF1_W_width_d
SHOW #A;
LOCK 0;
    •
    •
    •
ADD N38 :F0.5 "SEL" -33,0;
ADD w_buf_a9v -30,0;
ADD N43 :F0.5 "(row=1)" 36,9;
ADD N43 :F0.5 "FILL14 [_fill_]" 36, 8;
ADD w_fill14u 36,8;                    ———— 356
ADD N43 :F0.5 "(yoffset=5.04)" 36,16;
ADD N43 :F0.5 "(row=1)" 36,15;
ADD N43 :F0.5 "FILL5 [_msloc_]" 36,14;
ADD w_fill5u 36,14;
ADD N38 :F0.5 "S1 [0:0]" 36,4;         ———— 358
    •
    •                          ———— 360
ADD N43 :F0.5 "(row=1)" 36,1;
ADD N43 :F0.5 "MSGEN [_msloc_]" 36,0;
    •
    •                          ———— 362
ADD N38 :F0.5 "_s1place_" 0,4;
    •
    •
    •
ADD N38 :F0.5 "(row=1)" 12,8;
ADD N43 :F0.5 "(yoffset=3.36)" 12,7;
    •
    •
    •
```

FIG. 3B

SYSTEM FOR AUTOMATED GENERATION OF DATA PATH MACRO CELLS

TECHNICAL FIELD OF THE INVENTION

The present invention is related to integrated circuit (IC) design and fabrication and, more particularly, to providing a system for automated generation of data path macro cells.

BACKGROUND OF THE INVENTION

In integrated circuit (IC) design, a design technique known as "data path" is used, in which a bus passes through one macro cell after another, with each macro cell performing particular operations on the bus signals. A macro cell generally is a rectangular, tiled arrangement of leaf cells which performs a function, such as 'register', 'and' or 'add' logical functions on the bus signals. The data path design technique reduces routing complexity of the buses because each bus line enters one side of a cell of the macro cell and exits the opposite side of the cell of the macro cell. For example, assuming the IC comprises two 64-bit buses, a macro cell may comprise 64 cells, each of which comprises an AND gate. Two lines from each of the 64-bit buses pass through each respective cell and the corresponding signals on the two lines are ANDed together. The lines of the buses then exit the opposite side of the cell with signals on them that depend on the operation(s) performed by the cell. Other examples of macro cells include a macro cell having 64 flip flops, 64 exclusive NOR gate (XNOR), etc.

When an IC is designed in this manner with macro cells, the design is normally tiled because the macro cells are designed with respect to the width of the bus, or buses, such that the bus lines enter the top of a cell and exit the bottom of a cell and continue on to, for example, the next macro cell. Therefore, the IC will typically comprise a large number of these macro cells arranged symmetrically. Generally, before the IC is ever designed, a library of data path macro cells is created so that the IC designer will have a full set of macro cells that provide for various types of functionality to work with when designing the IC. The IC designer then builds the data path block, which generally is a stack of the macro cells with appropriate connections made to all of the macro cells and the cells of the macro cells.

Data path macro cells (macro cells) are typically created using a macro cell generator program. This macro-cell generator program is written by the IC designer by hand using a programming language, such as, for example, C, C++ or PERL. The macro cell generator program is used to generate data representing a graphical representation of the layout of the macro cell. Using the macro cell generator program, an IC designer individually places each element of a macro cell in the layout, along with data indicating each signal name and a documentation layer. Loops are typically included in the macro cell generator program to allow the IC designer to provide for various widths (data bus widths) of the macro cell. This process requires a great deal of time and effort to define the macro cell by determining the position/function of each element of the macro cell and then translating that information so that it can be incorporated into the macro cell generation program. Additionally, once the macro cell generation program is written, making changes to the macro cell layout is very difficult, as the macro cell generation program cannot be easily changed and thus requires the IC designer to re-write substantial portions of the program to generate a macro cell having the changed/desired characteristics. Thus, it is typical that a new macro cell generation program must be written in order to provide for a macro cell having different characteristics.

Accordingly, a need exists for a system to automate generation of a data path macro cell.

SUMMARY OF THE INVENTION

Other features and advantages of the present invention will become apparent from the following description, drawings and claims. The present invention provides a system and method for automated generation of data path macro cells.

Briefly described, in architecture, one embodiment of the system, among others, can be implemented as follows. Memory is provided for storing a text format template. A controller is provided. This controller is configured to generate data representing a graphical layout of a data path macro cell. It is also configured to generate a text format template comprising a variable, based upon the data representing a graphical layout of the data path macro cell. Further, the controller is configured to substitute a predetermined value for the variable to generate a text format file representative of a data path macro cell having predetermined characteristics. The controller is also configured to generate a data file representing a graphical layout of a data path macro cell represented by said text format file.

The present invention can also be viewed as providing methods for automated generation of data path macro cells. In this regard, one embodiment of such a method, among others, can be broadly summarized by the following steps: Data representing a graphical layout of a data path macro cell is generated. A text format template comprising a variable, is generated based upon the data representing a graphical layout of the data path macro cell. A predetermined value is substituted for the variable to generate a text format file representative of a data path macro cell having predetermined characteristics. A data file representative of a graphical layout of a data path macro cell represented by the text format file is generated.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

FIG. 3B is a diagram illustrating a text format template based upon the text format file of FIG. 3A.

DETAILED DESCRIPTION OF THE PREFERRED EMBODIMENT

In creating a data path block, an IC designer creates a graphical representation of a macro cell. This graphical representation of the macro cell is then used to generate a text format representation (archive) of the macro cell. Using the text format representation of the macro cell, a text format template is created in which predetermined constant values are replaced with respective variables. The IC designer may then use the text format template to create a graphical representation of a macro cell having other attributes. More particularly, by changing the variables set out in the text format template to values that correspond to characteristics of a desired macro cell, a graphical representation of the desire macro cell may be quickly created.

Figure 1:
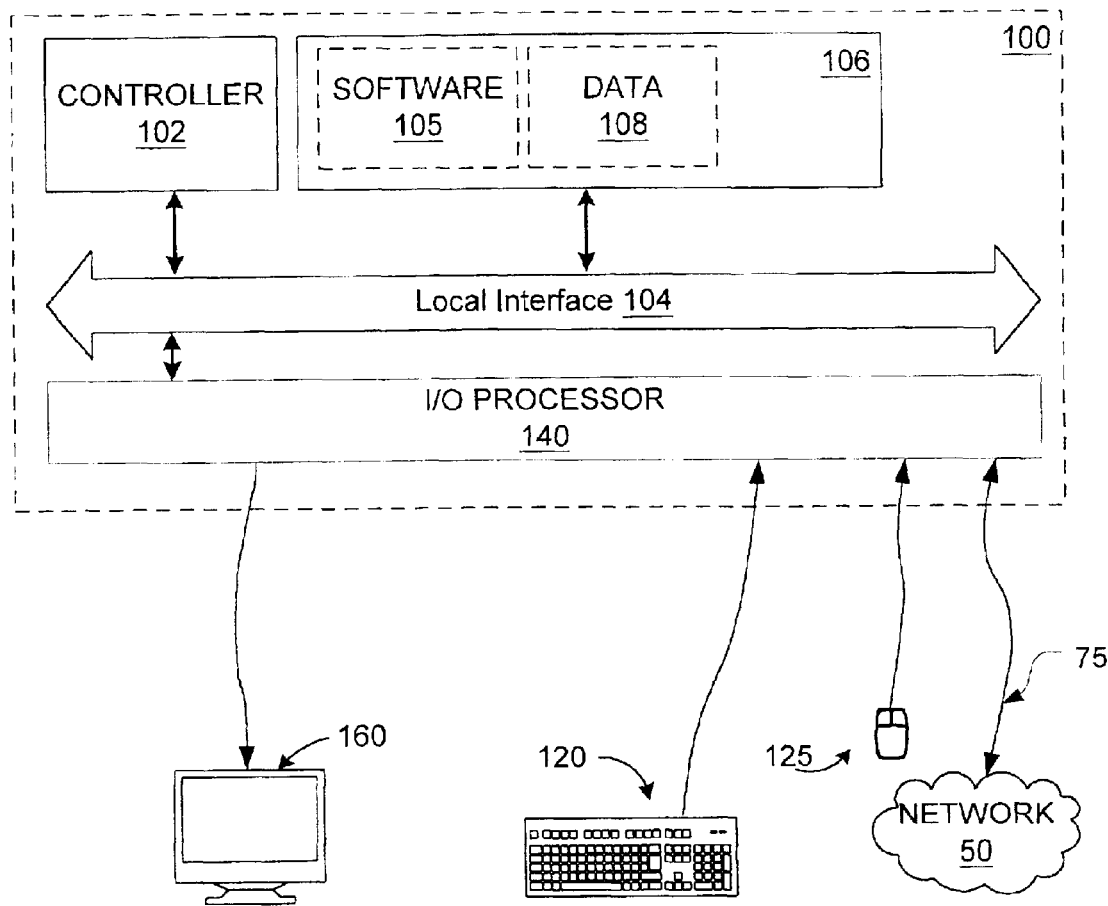
FIG. 1 is a block diagram illustrating a system 100 for automated generation of macro cells.

FIG. 1 shows a block diagram illustrating an example of a macro cell generation system 100 for automated generation of a data path macro cell. Macro cell generation system 100 includes a controller 102 and memory storage 106. Memory storage 106 may include memory for storing software 105 as well as data 108. Data 108 may include, among other things, a text format template representative of a macro cell design. It will be recognized that such data could also be stored on other memory associated with the macro cell generation system 100 and accessible thereby via, for example, the network 50. Software 105 may include software to configure the controller 102 to carry out operations associated with the process of generating a data path macro cell as described in, and discussed below with respect to the flowcharts of FIG. 2A and FIG. 2B. A local interface 104 is provided for transferring instructions and data between controller 102 and memory 106. Local interface 104 provides a conduit for transfer of electronic instructions and data from/to the input/output (I/O) processor 140. I/O processor 140 includes provisions for receiving data from, for example, a keyboard 120 and pointing device 125. I/O processor 140 also includes an interface 75 for connecting the test system 100 to a network 50, as well as outputting image data for display on a display device 160.

The software 105, comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium then compiled, interpreted or otherwise processed in a suitable manner, if necessary, and then stored in a computer memory.

Figure 2A:
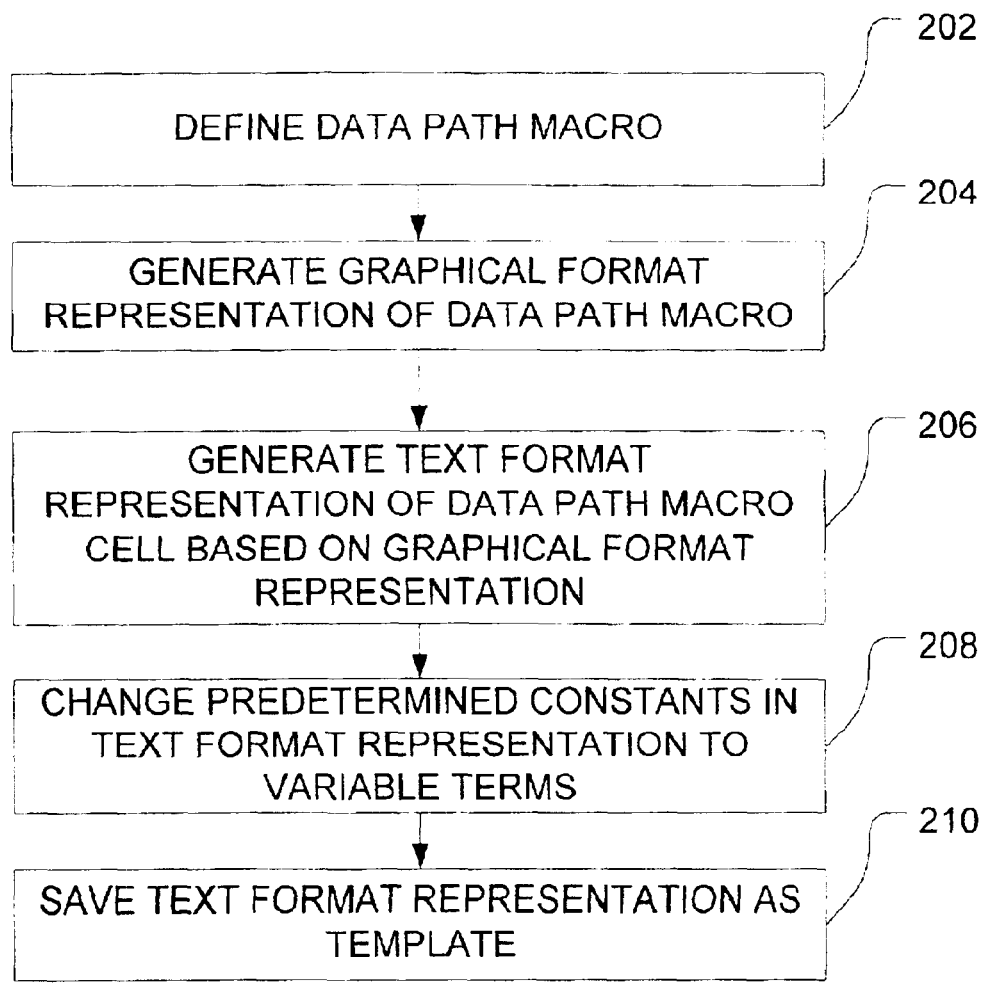
FIG. 2A is a flowchart illustrating an example of the method of creating a text format template in accordance with the present invention.

FIG. 2A is a flow chart illustrating an example embodiment of the method of the present invention for generating a text format template representative of a macro cell. In this method, a data path macro is defined (202). More particularly, the various characteristics and functionality of the data path macro cell will be determined by the IC designer.

Data (graphical data) representation of a graphical layout of the defined data path macro cell is generated (204). This graphical data may be generated by using a macro cell generator program. This macro cell generator program may be, for example, a program written using a programming language, such as C, C++, PERL, RTL or the like. It will, however, be recognized that other programming languages may also be used to accomplish the purposes of the macro cell generator program. In creating the data path macro cell generator program, the IC designer will incorporate data that specifies such things as the signal names and documentation layer information. Text format data representative of the data path macro cell is generated based upon the graphical data representation (206). This text format data may also be referred to as an "archive" file and may be generated by using one of many commonly available archive tools. This text format data describes the attributes or characteristics of the IC design represented by the graphical data. This text format data will specify values for the various characteristics of the IC represented by the graphical data. These values are constants that are specific to describing the characteristics of the IC layout represented by the graphical data.

The text format data is then modified or edited, to change predetermined constant values to variables (208) to create a text format template. More particularly by using a text editor program, an IC designer may edit the text format data to replace or substitute certain constant values specified in the text format data file with variables that may be readily changed. This edit operation may be carried out manually by the IC designer by use of a text editor program, or may be automated by implementing a script or program to facilitate the desired replacement of constants with variables based upon predetermined criteria.

The text format file with the changed variable terms is then saved as a text format template (210). This template may then be used to generate macro cells having different characteristics, such as data bus width, by replacing the variables with specific values that correspond to the desired macro cell characteristics. More particularly, the resulting text format template can subsequently be used to generate text format files descriptive of multiple macro cell designs merely by changing/substituting the variables in the text format template to values that correspond to a macro cell having desired characteristics. The text format template may be stored as data in memory such as memory 106 of system 100 (FIG. 1) for subsequent retrieval and use.

Figure 2B:
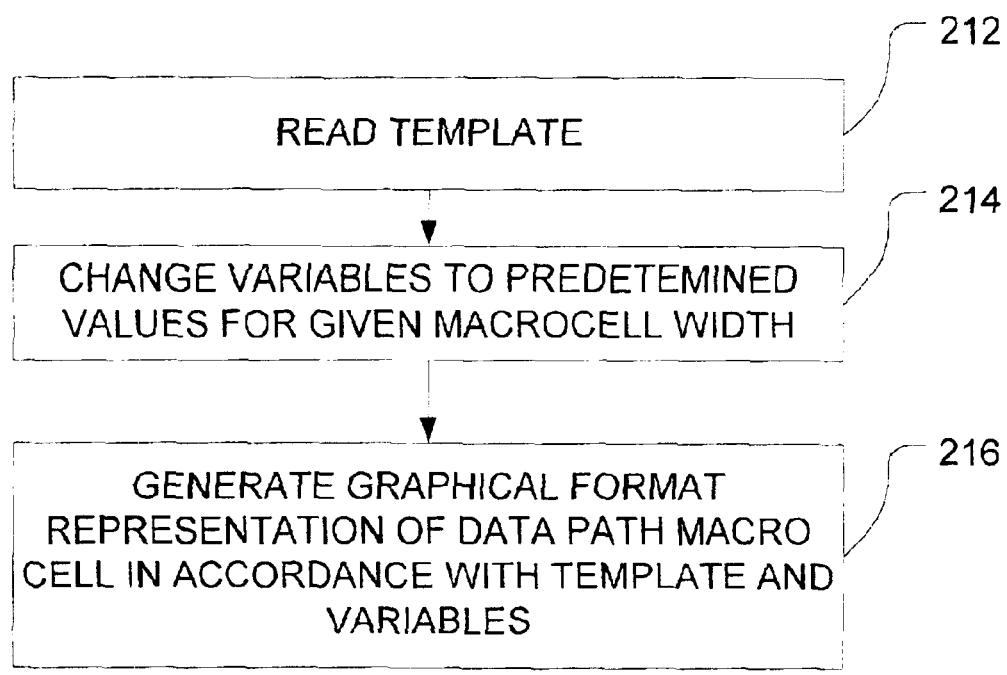
FIG. 2B is a flowchart illustrating an example of the method of generating a macro cell based upon a text format template in accordance with the present invention.

FIG. 2B is a flow chart illustrating an example embodiment of the method of the present invention for generating a macro cell based upon a text format template representative of a macro cell. In this method, a text format template is retrieved or read out of memory (212) and the variables set out in the text format template are changed to specify values that correspond to a macro cell having specific characteristics (214) to generate a text format file representative of a macro cell having predetermined/desired characteristics. For example, values may be entered into the text format template to specify a macro cell having a particular macro cell or data bus width as may be desired.

In turn, data representing a graphical layout (graphical data) of the macro cell represented by the text format file is generated based upon the values specified therein (216).

This text format file may be, for example, an archive type file format, or the like. It may also be a text file generated via Verilog hardware description language. This graphical data may be generated by using a macro cell generator program configured to convert the text format data (including substituted values) set out in the text format file into data representing a graphical layout of the macro cell specified by the text format file. This macro cell generator program may be, for example, a program written using a programming language, such as C, C++, PERL, Verilog HDL or RTL.

The flow charts of FIG. 2A and FIG. 2B show the architecture, functionality, and operation of a possible implementation of software that causes the process of automated generation of data path macro cells to be carried out by the system 100 (FIG. 1) and more particularly, by controller 102 (FIG. 1). In this regard, each block represents a module, segment, or portion of code, which comprises one or more executable instructions for implementing the specified logical function(s). It should also be noted that in some alternative implementations, the functions noted in the blocks may occur out of the order noted in FIG. 2A and/or FIG. 2B. For example, two blocks shown in succession in FIG. 2A and/or FIG. 2B may in fact be executed substantially concurrently or the blocks may sometimes be executed in the reverse order, depending upon the functionality involved, as will be further clarified hereinbelow.

Figure 3A:
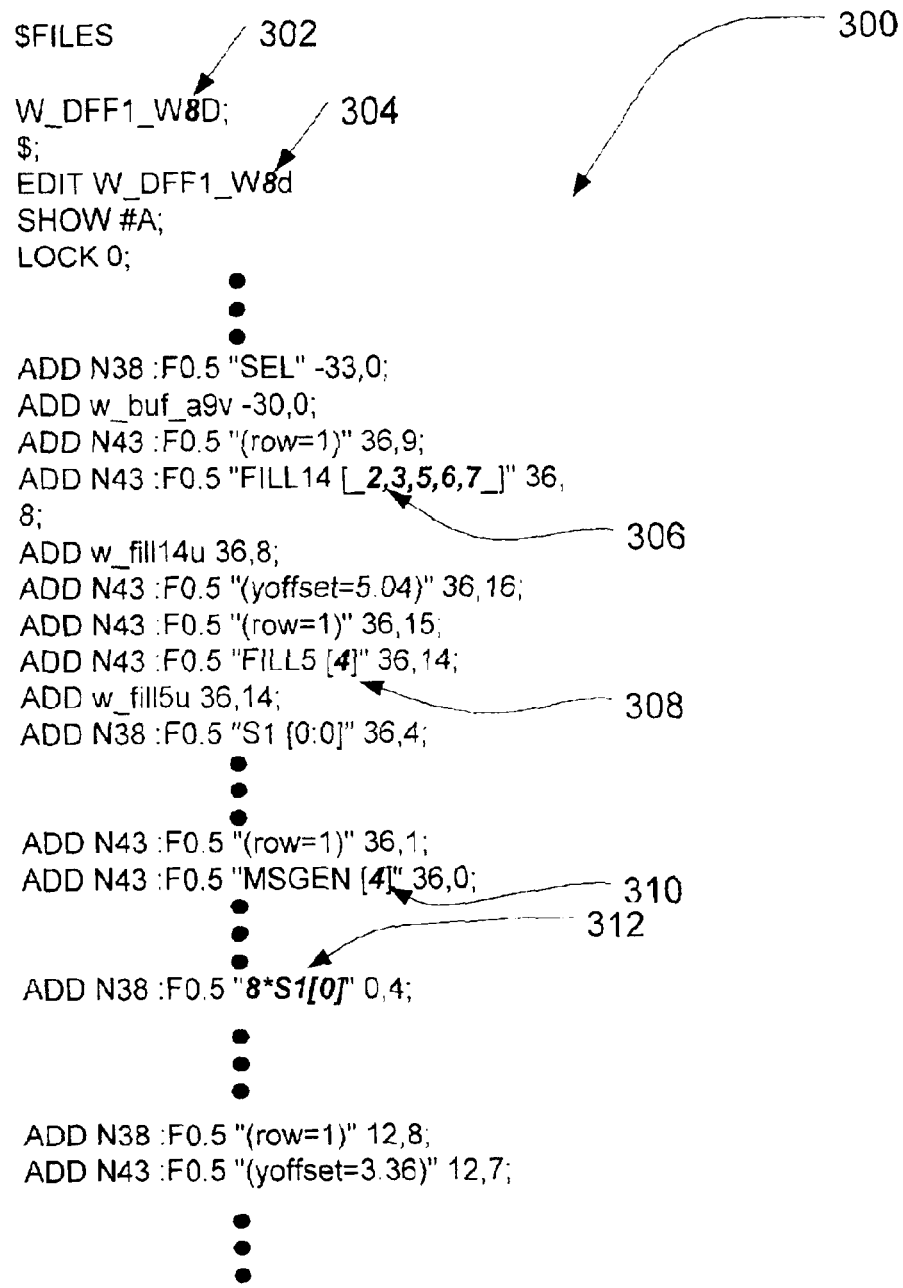
FIG. 3A is a diagram illustrating a text format file representing a macro cell.

FIG. 3A illustrates a text format file 300 generated based upon data representing a graphical layout of a macro cell having certain characteristics specified by constant values therein. This illustration shows only relevant parts of a sample text format file. It can be seen that this text format file contains a number of constant values including constant values 302, 304, 306, 308, 310 and 312. Constant values 302 and 304 are equal to "8", while constant values 308 and 310 are equal to "4". Similarly, constant value 306 specifies the values "2, 3, 5, 6, 7". The constant value 312 specifies the value "8*S1". FIG. 3B illustrates a text format template that has been created based upon the text format file of FIG. 3A. This illustration shows only relevant parts of a sample text format template. It can be seen that the constant values 302, 304, 306, 308, 310 and 312 of FIG. 3A have been replaced with variables 352, 354, 356, 358, 360 and 362, respectively, in the text template of FIG. 3D. For example, it can be seen that the constant value 302 ("8") has been replaced by a variable 352. Variable 352 specifies "width". Similarly, constant value 312 has been replaced by a variable 362 that specifies "$_{13}$slplace$_{13}$". This text format template may be generated merely by editing the text format file for a given macro cell to replace constant values with variables. Subsequently, these variables maybe changed again to values that will correspond to a macro cell having particular characteristics that will be specified by the particular values that are used to replace the variables. It will be recognized that the text format file illustrated by FIG. 3A, as well as the text template illustrated in FIG. 3B may constitute, for example, a Verilog format file and may otherwise be created via, for example, use of the Verilog hardware description language.

It should be emphasized that the above-described embodiments of the present invention are example embodiments set forth for the purpose of providing a clear understanding of the principles of the invention and the manner in which the present invention can be implemented. Many variations and modifications may be made to the above-described embodiments that are within the scope of the present invention, as will be understood by those skilled in the art in view of this disclosure. All such modifications and variations are intended to be within the scope of the present invention.

What is claimed is:

1. A system for generating a data path macro cell comprising:

memory; and a controller configured to generate data representing a graphical layout of a data path macro cell;

wherein the controller is configured to generate a text format template comprising a variable, the text format template being generate based upon said data representing a graphical layout of said data path macro cell;

wherein the controller is configured to store the text format template in the memory and retrieve the format template from the memory;

wherein controller is further configured to substitute a predetermined value for said variable to generate a text format file representative of a data path macro cell having predetermined characteristics; and wherein the controller is further configured to generate a data file representing a graphical layout of a data path macro cell represented by said text format file.

2. A system for generating a data path macro cell comprising:

memory for storing a text format template, said text format template comprising a variable; and a controller configured to retrieve said text format template and substitute a predetermined value for said variable to generate a text format file representative of a data path macro cell having predetermined characteristics;

wherein controller is further configured to generate a data file representing a graphical layout of a data path macro cell represented by said text format file.

3. The system of claim 2, wherein said text format template comprises a plurality of variables.

4. The system of claim 3, wherein said controller is further configured to substitute respective predetermined values for said plurality of variables to generate said text format file representative of said data path macro cell.

5. The system of claim 2, wherein said controller is further configured to generate said text format template based upon data representing a graphical layout of a data path macro cell.

6. The system of claim 5, wherein said controller is further configured to generate said data representing a graphical layout of said data path macro cell.

7. The system of claim 6, wherein said controller is further configured to generate said data representing a graphical layout of said data path macro based upon user input.

8. The system of claim 2, wherein said controller is further configured to generate a text format representation comprising a constant, based upon data representing a graphical layout of a data path macro cell; and wherein said controller is further configured to substitute a variable for said constant to generate said text format template comprising a variable.

9. A method of generating a data path macro cell comprising the steps of:

retrieving a text format template comprising a variable;

substituting a predetermined value for said variable to generate a text format file representative of a data path macro cell having predetermined characteristics; and generating a data file representative of a graphical layout of a data path macro cell represented by said text format file.

10. The method of claim 9, further comprising the step of generating said text format template based upon data representing a graphical layout of a data path macro cell.

11. The method of claim 10, further comprising the step of generating said data representing a graphical layout of said data path macro cell.

12. The method of claim 11, further comprising the step of generating said data representing a graphical layout of said data path macro based upon user input.

13. A method of generating a data path macro cell comprising the steps of:
generating data representing a graphical layout of a data path macro cell;
generating a text format template comprising a variable, based upon said data representing a graphical layout of said data path macro cell;
substituting a predetermined value for said variable to generate a text format file representative of a data path macro cell having predetermined characteristics; and
generating a data file representative of a graphical layout of a data path macro cell represented by said text format file.

14. The method of claim 13, wherein said step of generating a text format template comprises the steps of:
generating a text format representation comprising a constant, based upon said data representing a graphical layout of said data path macro cell; and
substituting a variable for said constant to generate a text format template comprising a variable.

15. A computer program for generating a data path macro cell, the computer program comprising:
a first code segment for retrieving a text format template comprising a plurality of variables;
a second code segment for substituting respective values for said variables in said text format template to generate a text format file representative of a data path macro cell having predetermined characteristics; and
a third code segment for generating a data representative of a graphical layout of a data path macro cell represented by said text format file.

16. The computer program according to claim 15, further comprising:
a fourth code segment for generating said text format template based upon data representing a graphical layout of a data path macro cell.

17. The computer program according to claim 16, further comprising a fifth code segment for generating said data representing a graphical layout of said data path macro cell.

18. The computer program according to claim 17, further comprising a sixth code segment for generating said data representing a graphical layout of said data path macro based upon user input.

* * * * *